United States Patent Office 3,047,181
Patented July 31, 1962

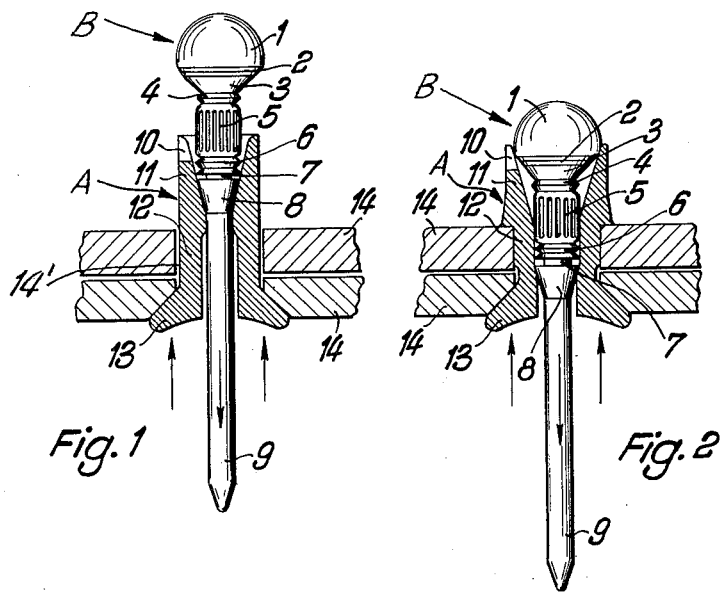
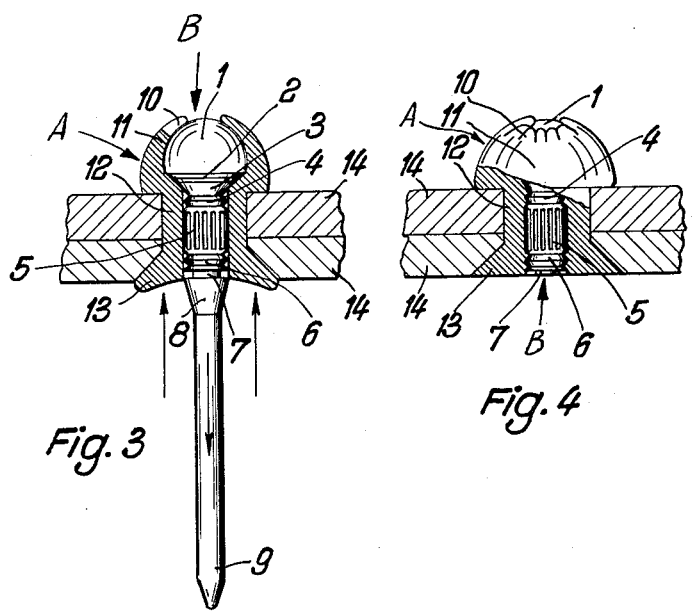

3,047,181
RIVET COMBINATION
Hermann Heidenwolf, Bad Sodenerstrasse 29, Salmunster, Germany, assignor of one-half to Hans-Georg Biermann, Frankfurt am Main, Germany
Filed Feb. 27, 1957, Ser. No. 642,771
Claims priority, application Germany Feb. 28, 1956
4 Claims. (Cl. 218—29)

The present invention relates to a rivet combination for arrangement in work having at least one face accessible.

Rivet combinations, of the type called blind rivets, have gone into extensive use in situations where one side of the structure or assembly to be worked upon is inaccessible or impractical to reach with riveting tools required for regular riveting. Such rivet combinations are known and comprise a hollow rivet member provided on one end with a rivet head for engaging the accessible face of the assembly or work and a mandrel positioned in and extending through the hollow rivet member and having at the end thereof adjacent the other end of the hollow rivet member a head. The diameter of the head is larger than the inner diameter of the hollow rivet member, and by pulling the mandrel outwardly while holding the hollow rivet member against outward movement, the head of the mandrel expands the inner or other end of the hollow rivet member against the blind or inaccessible face of the assembly or work, to thus secure the rivet. Following the expansion of the inner end of the hollow rivet member, the protruding outer portion or stem of the mandrel is cut off substantially flush with the accessible end of the hollow rivet member to complete the riveting procedure.

While in the known rivet combinations, the rivet is fluid tight because the mandrel fits tightly the bore of the hollow rivet member and the latter fits tightly the opening in the work, the means for positively retaining the mandrel in the hollow rivet member, proposed in the known rivet combinations, have been found insufficient in a great number of applications.

It is, therefore, one object of the present invention to provide a rivet combination which avoids the drawbacks of the known structures.

It is another object of the present invention to provide a rivet combination which comprises a hollow rivet member, which has a rivet head on one end for engaging the accessible face of the work and is formed with an inward taper toward the rivet head at the other end, and which combination further comprises a mandrel which extends through the hollow rivet member and has at the end adjacent the other end of the rivet member a terminal, substantially spherical portion having a smooth uninterrupted surface.

It is still another object of the present invention to provide a rivet combination which comprises a hollow rivet member and a mandrel extending through the hollow rivet member, and the hollow rivet member has a rivet head on one end for engaging the accessible face of the work and is formed with an inward taper toward the rivet head at its other end, to be followed, in a direction toward the rivet head, by a first cylindrical bore of smallest inner diameter of said hollow rivet member and a second cylindrical bore of a slightly greater inner diameter.

It is yet another object of the present invention to provide a rivet combination which comprises a hollow rivet member and a mandrel extending through the hollow rivet member and the hollow rivet member has a bore of smallest inner diameter along a predetermined portion of its longitudinal axis, which portion is disposed with its rivet-head-facing end substantially in the plane of the outer or inaccessible face of the work.

With these and other objects in view which will become apparent in the following detailed description, the present invention will be clearly understood in connection with the accompanying drawing, in which:

FIGURE 1 is an axial section of the rivet combination prior to the riveting operation; and FIGS. 2 to 4 are axial sections of the rivet combinations, showing the combination at different stages of the riveting operation.

Referring now to the drawing, and in particular to FIG. 1, the rivet combination comprises a hollow rivet member A and a mandrel B positioned in and extending through the hollow rivet member A.

The assembly or the work, in which the rivet combination A, B is to be installed, comprises two plates, sheets, or the like 14, arranged in face to face relation and having an opening 14' passing therethrough. It will be assumed that the side shown in the drawing as upper side of the work 14 is inaccessible or difficult of access, while the side shown in the drawing as lower side of the work 14 is readily accessible.

The hollow rivet member A comprises a hollow rivet body 12 having an outer cylindrical surface and a preformed rivet head 13 at one end for engaging the face of the accessible side of the work 14. The other end 11 of the hollow rivet body 12 is formed with an inward taper toward the rivet head 13. The last mentioned inward taper extends from the other end of the hollow rivet body 12 in axial direction to a point of smallest inner diameter of the hollow rivet body 12. The latter is of a length sufficient to pass through the work 14, so that the other end of the hollow rivet body 12 will extend beyond the work 14.

The mandrel B comprises at the end thereof adjacent the other end of the hollow rivet body 12, thus being on the inaccessible side of the work 14, a terminal, substantially spherical portion 1 which has a smooth uninterrupted surface and an outer diameter which is not greater than the outer diameter of the outer end of the tapered portion 11 of the hollow rivet body 12. The portion of the latter, formed by the taper of the portion 11, is adapted to engage the face of the work 14 on the inaccessible side of the latter and to enclose the terminal, spherical portion 1 of the mandrel B after riveting, and, thereby, to form therewith a tail-end head.

The mandrel B has further in the direction of the rivet head 13 a cylindrical portion 5 which has a diameter greater than the smallest inner diameter of the hollow rivet body 12 and is adapted to form a filling portion in the hollow rivet body 12 and to be tightly fitted into the hollow rivet body 12 in the final upset stage of the rivet combination. An obtuse cone 3 is provided on the spherical portion 1 adjacent the cylindrical portion 5. The outer end of the obtuse cone 3 of the spherical portion 1 is equipped with a plurality of annular grooves 2 adapted to provide a still better retention of the mandrel B in the hollow rivet member A.

As clearly shown in the drawing, the mandrel B has still further in the direction of the rivet head 13, extending from the cylindrical portion 5, a tapered portion 8 which narrows down towards the other end of the mandrel B to a diameter substantially corresponding with the smallest inner diameter of the hollow rivet body 12, and finally a cylindrical portion 9 of the mentioned smallest diameter which is of sufficient length to form the stem 9, adapted to permit gripping of the mandrel B for pulling the latter outwardly while holding the hollow rivet member A against outward movement during the riveting operation.

Following the expansion of the hollow rivet body 12 in the opening 14' in the work 14 and the forming of a tail-end head by the terminal portion 1 and the inward taper at the inaccessible end 11 of the hollow rivet body 12, the protruding outer portion of the stem 9 is cut off substantially flush with the accessible end of the rivet combination to complete the riveting operation.

In order to provide still additional means for retaining the mandrel B in the hollow rivet member A, both ends of the cylindrical portion 5 may have annular grooves 4 and 6, respectively.

For reasons to be set forth below, the terminal, substantially spherical portion 1 has an axial length substantially at least equal to the axial length of the inward taper at the inaccessible end 11 of the hollow rivet body 12, while the terminal, substantially spherical portion 1 and the cylindrical portion 5 of the mandrel B have a combined length in axial direction between their remote extremities substantially equal with the length of the hollow rivet member A.

Referring now to FIG. 2 of the drawing, the rivet combination is shown in a position where the mandrel B has been pulled partly outwardly into the hollow rivet member A, while the latter has been held against outward movement. Due to the fact that the diameter of the cylindrical portion 5 of the mandrel B is larger than the smallest inner diameter in the hollow rivet body 12, the wall of the latter is expanded against the surface of the opening 14' in the work 14 and the rivet is thus tightened in the opening 14' of the work 14 (FIG. 2).

Referring now to FIGS. 3 and 4 of the drawing, it will be readily seen that upon further pulling outwardly of the mandrel B, the inward taper at the inaccessible end 11 of the hollow rivet member A flows over the smooth surface of the terminal, spherical portion 1 of the mandrel B and encloses the latter to form a tail-end head and simultaneously expands outwardly for engagement of the tail-end head with the inaccessible face of the work 14 in the final upset stage of the rivet combination.

In order to bring about a substantial enclosure of the terminal, spherical portion 1 of the mandrel B by the inward taper at the inaccessible end 11 of the hollow rivet member A, it is required that the axial length of the terminal, spherical portion 1 be substantially at least equal to the axial length of the mentioned inward taper. The flow of the inward taper over the terminal portion 1 is facilitated, particularly at the final phase thereof, by providing teeth 10 at the extreme outer end of the inward taper.

A portion 7 of narrow diameter is provided on the mandrel B, preferably, between the cylindrical portion 5 and the tapered portion 8, in order to locate the breaking point for the protruding outer portion of the stem 9 of the mandrel B at the point of the narrowest diameter, namely at the portion 7 of the mandrel B. As shown in FIGS. 3 and 4, in the final upset stage of the combination the portion 7 of the mandrel B is disposed substantially flush with the accessible end of the rivet and the accessible face of the work 14, respectively. In the final upset stage of the combination, the terminal portion 1 and the cylindrical portion 5 remain in the hollow rivet member A, and it is required accordingly to provide a combined length in axial direction of the terminal portion 1 and the cylindrical portion 5 between their remote extremities which combined length is substantially equal to the length of the hollow rivet member A.

While I have disclosed one embodiment of the present invention, it is to be understood that this embodiment is given by example only and not in a limiting sense, the scope of the present invention being determined by the objects and the claims.

What I claim is:

1. A rivet combination for arrangement in work having at least one face accessible, said combination comprising a hollow rivet member having a rivet head on one end for engaging one face of said work and being formed with an inward taper toward said rivet head at its other end, said taper extending from said other end to the smallest inner diameter of said hollow rivet member, said hollow rivet member being of a length sufficient to pass through said work so that said other end of said hollow rivet member will extend beyond said work, a mandrel positioned in said hollow rivet member and comprising at the end thereof adjacent said other end of said rivet member a terminal, substantially spherical portion having a smooth uninterrupted surface and an outer diameter not greater than the outer diameter of the tapered end of said hollow rivet member, as well as an axial length substantially at least equal to the axial length of said tapered portion, and having in the direction of said rivet head a cylindrical portion of a diameter greater than said smallest inner diameter of said hollow rivet member and adapted to form a filling portion in said hollow rivet member, and still further in the direction of said rivet head a tapered portion narrowing down towards the other end of said mandrel to a diameter substantially corresponding with said smallest inner diameter of said hollow rivet member, said terminal portion and said cylindrical portion having a combined length in axial direction between their remote extremities substantially equal to the length of said hollow rivet member, said tapered portion of said hollow rivet member being adapted to enclose said terminal portion of said mandrel after riveting and thereby to form a tail-end head, the latter functioning for engaging the other face of said work, and said cylindrical portion of said mandrel being adapted to be tightly fitted into said hollow rivet member in the final upset stage of said combination.

2. The rivet combination, as set forth in claim 1, wherein said hollow rivet member has at the inner end of said taper a first cylindrical bore of said smallest inner diameter and a second cylindrical bore of a slightly greater inner diameter extending through the remaining portion of said hollow rivet member.

3. The rivet combination, as set forth in claim 1, wherein the outer end of said taper of said hollow rivet member is toothed.

4. A structure for forming a riveting joint comprising a hollow rivet member having a rivet head on one end for engaging one face of a work plate structure and being formed with an inward taper toward said rivet head at its other end, said taper extending from said other end to the smallest inner diameter of said hollow rivet member, said hollow rivet member being of a length sufficient to pass through said work so that said other end of said hollow rivet member will extend beyond said work, a mandrel positioned in said hollow rivet member and comprising at the end thereof adjacent said other end of said rivet member a terminal, substantially spherical portion having a smooth uninterrupted surface and an outer diameter not greater than the outer diameter of the tapered end of said hollow rivet member, as well as an axial length substantially at least equal to the axial length of said tapered portion, and having in the direction of said rivet head a cylindrical portion of a diameter greater than said smallest inner diameter of said hollow rivet member and adapted to form a filling portion in said hollow rivet member, and still further in the direction of said rivet head a tapered portion narrowing down towards the other end of said mandrel to a diameter substantially corresponding with said smallest inner diameter of said hollow rivet member, said terminal portion and said cylindrical portion having a combined length in axial direction between their remote extremities substantially equal to the length of said hollow rivet member, said tapered portion of said hollow rivet member being adapted to enclose said terminal portion of said mandrel after riveting and thereby to form a tail-end head, the latter functioning for engaging the other face of said work, and said cylindrical portion of said mandrel being adapted to be tightly fitted into said hollow rivet member in the final upset stage of said combination, said structure including a plate provided with an opening therethrough, and in which the portion of said hollow rivet member having the smallest inner diameter is disposed with its rivet-head-facing end substantially in the plane of the outer face of the side of said plate closest to said inward taper of said hollow rivet member.

References Cited in the file of this patent

UNITED STATES PATENTS

| | | |
|---|---|---|
| 2,248,755 | Hathorn | July 8, 1941 |
| 2,343,283 | Davis | Mar. 7, 1944 |
| 2,384,321 | Lees | Sept. 4, 1945 |
| 2,435,876 | De Swart | Feb. 10, 1948 |
| 2,466,811 | Huck | Apr. 12, 1949 |
| 2,652,741 | Ketchum | Sept. 22, 1953 |
| 2,691,915 | Cherry | Oct. 19, 1954 |
| 2,756,624 | Austin | July 31, 1956 |

FOREIGN PATENTS

| | | |
|---|---|---|
| 504,928 | Great Britain | Apr. 28, 1939 |
| 564,848 | Great Britain | Oct. 16, 1944 |